United States Patent
Kume et al.

(10) Patent No.: US 9,086,498 B2
(45) Date of Patent: Jul. 21, 2015

(54) TWO-DIMENSIONAL RADIATION DISPLAY DEVICE AND TWO-DIMENSIONAL RADIATION DISPLAY METHOD

(71) Applicant: Kabushiki Kaisha Toshiba, Minato-ku (JP)

(72) Inventors: Naoto Kume, Yokohama (JP); Toru Onodera, Yokohama (JP); Yoshinori Satoh, Yokohama (JP); Shunichiro Makino, Yokosuka (JP); Tatsuyuki Maekawa, Shinagawa-ku (JP); Tsukasa Teramura, Tokorozawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/370,351

(22) PCT Filed: Dec. 26, 2012

(86) PCT No.: PCT/JP2012/008326
§ 371 (c)(1),
(2) Date: Jul. 2, 2014

(87) PCT Pub. No.: WO2013/102989
PCT Pub. Date: Jul. 11, 2013

(65) Prior Publication Data
US 2015/0030133 A1    Jan. 29, 2015

(30) Foreign Application Priority Data
Jan. 6, 2012    (JP) .................. 2012-001462

(51) Int. Cl.
*G01T 1/10*    (2006.01)
*G01V 5/00*    (2006.01)
*G01T 1/169*    (2006.01)
*G01T 1/17*    (2006.01)
*G06T 11/00*    (2006.01)
*G06T 11/20*    (2006.01)

(52) U.S. Cl.
CPC .............. *G01V 5/0091* (2013.01); *G01T 1/169* (2013.01); *G01T 1/17* (2013.01); *G06T 11/001* (2013.01); *G06T 11/206* (2013.01)

(58) Field of Classification Search
CPC ........................................................ G01T 1/169
USPC .......................................... 250/362; 378/98.8
See application file for complete search history.

(56) References Cited

U.S. PATENT DOCUMENTS

| 8,785,876 B2 * | 7/2014 | Tajima ..................... 250/394 |
| 2003/0117355 A1 * | 6/2003 | Yamauchi ................. 345/87 |

FOREIGN PATENT DOCUMENTS

| JP | 05268479 A | * 10/1993 | ............... H04N 1/40 |
| JP | 2004 20409 | 1/2004 | |
| JP | 2005 49148 | 2/2005 | |
| JP | 2008 292166 | 12/2008 | |
| JP | 4371723 | 11/2009 | |
| JP | 2013 142545 | 7/2013 | |

OTHER PUBLICATIONS

International Search Report Issued Apr. 9, 2013 in PCT/JP12/008326 Filed Dec. 26, 2012.

* cited by examiner

*Primary Examiner* — Kiho Kim
(74) *Attorney, Agent, or Firm* — Oblon, McClelland, Maier & Neustadt, L.L.P.

(57) ABSTRACT

A two-dimensional radiation display device includes: a data acquisition unit that acquires two-dimensional radiation data detected a plurality of times from a plurality of radiation detectors; a data division processing unit that divides the two-dimensional radiation data into data regions of each section of specified direction; an integration processing unit that integrates the two-dimensional radiation data that is detected a plurality of times, for each section of specified direction; a data synthesis processing unit that synthesizes the integration values integrated for each section of specified direction into two-dimensional data including radiation distribution; and an image output unit that outputs two-dimensional data indicating radiation distribution as display data in accordance with a prescribed display format.

11 Claims, 9 Drawing Sheets

TWO-DIMENSIONAL RADIATION DISPLAY DEVICE AND TWO-DIMENSIONAL RADIATION DISPLAY METHOD

TECHNICAL FIELD

Embodiments of the present invention relate to a two-dimensional radiation display device and a two-dimensional radiation display method.

BACKGROUND ART

A two-dimensional radiation display device is a device which displays intensity by color or luminance with a two-dimensional arrangement of the direction of a radiation source. The direction of the radiation source is displayed on a visible image imaged by a CCD (Charge Coupled Device) image sensor or the like in a superimposed manner, thereby intuitively recognizing the direction and the intensity of the radiation source.

As a method which is used to obtain two-dimensional radiation intensity distribution data, a method in which radiation detectors are arranged in a two-dimensional array and the outputs (pulse count values, current values, voltage values, or the like) of the respective radiation detectors are arranged in a two-dimensional arrangement, a method in which a scintillator emitting light with the incidence of radiation is imaged by a CCD camera or the like, or the like is known.

A γ-ray radioactivity distribution imaging method is shown which detects the intensity of γ-rays multiple times to image a radioactivity distribution while rotating a γ-ray detector array with the incidence direction of the γ-rays as a rotation axis. According to this method, a radioactivity distribution in which a predetermined formula is minimal and the relative value of sensitivity of the γ-ray detectors are obtained by fitting calculation using a least squares method, fitting calculation of the predetermined formula is repeatedly performed, and the radioactivity distribution of a radioactive material is obtained.

A γ-ray imaging device which is carried and installed at a site during construction of a nuclear facility, can detect a radiation operation environment, and is designed for the purpose of high sensitivity and compactness, and in which a CdTe semiconductor sensor array having high stopping power and a large single-hole collimator are combined, or the like is disclosed.

PRIOR ART DOCUMENTS

Patent Documents

Patent Document 1: Japanese Patent No. 4371723

Non-Patent Document

Non-Patent Document 1: Convention D38 Autumn Atomic Energy Society of Japan 2002 "Development of compact high-sensitivity γ-ray imaging apparatus using a CdTe array"

SUMMARY OF THE INVENTION

Problems to be Solved by the Invention

In an area which is contaminated by an accident in a nuclear power plant or the like, prompt decontamination of a radioactive material is required. However, in a dosimeter of the related art, it takes a lot of time to find out the place which is contaminated by the radioactive material, and it is difficult to efficiently promote decontamination.

A two-dimensional radiation display device which easily shows a contaminated part is effective as a tool for realizing improvement of efficiency of decontamination. However, there is a problem in that it takes a lot of time until a contaminated part is found out in a low air dose environment.

If a contaminated part can be recognized before decontamination starts, only the contaminated part by the radioactive material is decontaminated, thereby, decontamination is carried out efficiently. The same applies to a decontamination confirmation operation of the contaminated part after decontamination.

An object of the embodiments of the present invention is to provide a two-dimensional radiation display device and a two-dimensional radiation display method capable of recognizing the parts contaminated by the radioactive material in a short time.

Means for Solving the Problem

In order to solve the problem, according to an embodiment, there is presented a two-dimensional radiation display device which receives a radiation detection signal from an array of a plurality of radiation detectors arranged in a two-dimensional manner and is able to output display data for displaying a radiation distribution on a basis of the radiation detection signal. The two-dimensional radiation display device comprises: a data acquisition unit which converts the radiation detection signal detected multiple times from the plurality of radiation detectors to two-dimensional radiation data corresponding to positions in the array; a data division processing unit which divides the two-dimensional radiation data converted by the data acquisition unit into regions of each section of specified direction; an integration processing unit which integrates the two-dimensional radiation data for each of the regions of each section of specified direction divided by the data division processing unit; a data synthesis processing unit which synthesizes two-dimensional data representing a radiation distribution on a basis of an integrated value of each of the regions of each section of specified direction integrated by the integration processing unit; and an image output unit which outputs the two-dimensional data synthesized by the data synthesis processing unit as display data according to a predetermined display format.

According to another embodiment, there is presented a two-dimensional radiation display device which receives a radiation detection signal from an array of a plurality of radiation detectors arranged in a two-dimensional manner and is able to output display data for displaying a radiation distribution on a basis of the radiation detection signal. The two-dimensional radiation display device comprises: a data acquisition unit which converts the radiation detection signal detected multiple times from the plurality of radiation detectors to two-dimensional radiation data corresponding to positions in the array; a region determination data division processing unit which divides the two-dimensional radiation data converted by the data acquisition unit to be equal to or greater than the determination value according to a determination value as a reference for dividing regions; an integration processing unit which integrates the two-dimensional radiation data for each of the regions divided by the region determination data division processing unit; a data synthesis processing unit which synthesizes two-dimensional data representing a radiation distribution on a basis of an integrated value of each of the regions of each section of specified direction integrated by the integration processing unit; and an image output unit which outputs the two-dimensional data synthesized by the data synthesis processing unit as display data according to a predetermined display format, wherein the region determination data division processing unit determines the determination value on a basis of precision of the integrated value or a statistically significant value and divides the two-dimensional radiation data with the determination value determined by the region determination data division processing unit as a reference.

In order to solve the problem, according to an embodiment, there is presented a two-dimensional radiation display method for a two-dimensional radiation display device which receives a radiation detection signal from an array of a plurality of radiation detectors arranged in a two-dimensional manner and is able to output display data for displaying a radiation distribution on a basis of the radiation detection signal. The two-dimensional radiation display method comprises: a data acquisition step of causing data acquisition means of the two-dimensional radiation display device to convert the radiation detection signal detected multiple times from the plurality of radiation detectors to two-dimensional radiation data corresponding to positions in the array; a data division processing step of causing data division processing means of the two-dimensional radiation display device to divide the two-dimensional radiation data converted in the data acquisition step into regions of each section of specified direction; an integration processing step of causing integration processing means of the two-dimensional radiation display device to integrate the two-dimensional radiation data for each of the regions of each section of specified direction divided in the data division processing step; a data synthesis processing step of causing data synthesis processing means of the two-dimensional radiation display device to synthesize two-dimensional data representing a radiation distribution on a basis of an integrated value of each of the regions of each section of specified direction divided in the integration processing step; and an image output step of causing image output means of the two-dimensional radiation display device to output the two-dimensional data synthesized in the data synthesis processing step as display data according to a predetermined display format.

In order to solve the problem, according to another embodiment, there is presented a two-dimensional radiation display method for a two-dimensional radiation display device which receives a radiation detection signal from an array of a plurality of radiation detectors arranged in a two-dimensional manner and is able to output display data for displaying a radiation distribution on a basis of the radiation detection signals. The two-dimensional radiation display method comprises: a data acquisition step of causing data acquisition means of the two-dimensional radiation display device to convert the radiation detection signal detected multiple times from the plurality of radiation detectors to two-dimensional radiation data corresponding to positions in the array; a region determination data division processing step of causing region determination data division processing means of the two-dimensional radiation display device to divide the two-dimensional radiation data converted in the data acquisition step according to a determination value as a reference for dividing regions; an integration processing step of causing integration processing means of the two-dimensional radiation display device to integrate the two-dimensional radiation data for each of the regions divided in the region determination data division processing step; a data synthesis processing step of causing data synthesis processing means of the two-dimensional radiation display device to synthesize two-dimensional data representing a radiation distribution on a basis of an integrated value of each of the divided regions integrated in the integration processing step; and an image output step of causing image output means of the two-dimensional radiation display device to output the two-dimensional data synthesized in the data synthesis processing step as display data according to a predetermined display format, wherein, in the region determination data division processing step, the determination value as a reference for dividing regions is determined on a basis of precision of the integrated value or a statistically significant value and the two-dimensional radiation data is divided with the determined determination value determined by the region determination data division processing step as a reference.

Advantage of the Invention

According to the two-dimensional radiation display device or the two-dimensional radiation display method of the present invention, the parts contaminated by the radioactive material can be recognized in a short time period.

EMBODIMENTS FOR CARRYING OUT THE INVENTION

Figure 1:
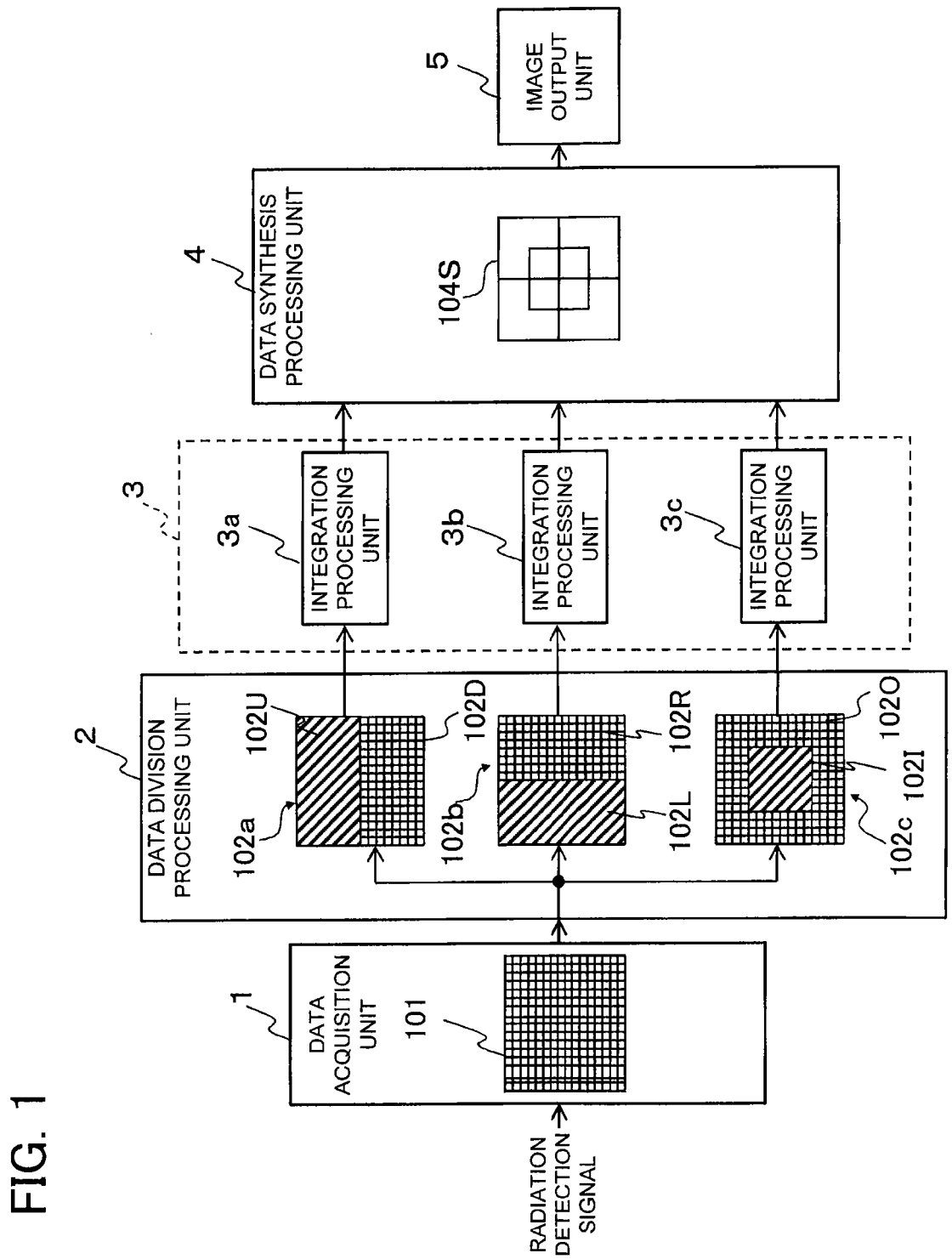
FIG. 1 is a block diagram illustrating the configuration of a first embodiment of a two-dimensional radiation display device according to the present invention.

Hereinafter, a two-dimensional radiation display device according to an embodiment of the present invention will be specifically described referring to the drawings. Here, the same or similar parts are represented by common reference numerals, and overlapping description will be omitted. The following embodiments will be described as to an example of a two-dimensional radiation display device which uses a γ-ray detector as a radiation detector.

[First Embodiment]

FIG. 1 is a block diagram illustrating the configuration of a first embodiment of a two-dimensional radiation display device according to the present invention. Hereinafter, the first embodiment of the two-dimensional radiation display device according to the present invention will be described referring to other drawings.

As illustrated in FIG. 1, a two-dimensional radiation display device includes a data acquisition unit 1, a data division processing unit 2, an integration processing unit 3, a data synthesis processing unit 4, and an image output unit 5. The integration processing unit 3 includes, for example, integration processing units 3a, 3b, and 3c for respective regions to be integrated.

The two-dimensional radiation display device of the first embodiment acquires the intensity distribution of a radiation from a radiation detector (not shown). For example, the radiation detector may be a γ-ray detector array which has a plurality of γ-ray detectors having a pinhole or a collimator.

Specifically, in a γ-ray detector array having a pinhole, for example, an opening is provided at the center of a shielding plate, and a plurality of γ-ray detectors are provided so as to detect a radiation incident from the opening of the shielding plate. In a γ-ray detector array having collimators, for example, a plurality of cylindrical hollow collimators made of lead are provided corresponding to the positions of a plurality of γ-ray detectors. Accordingly, γ-rays emitted from a radioactive material pass through the collimators, and the γ-rays having passed through the collimators are detected by a plurality of γ-ray detectors.

As described below in detail, the two-dimensional radiation display device of the first embodiment receives a radiation detection signal from an array of a plurality of radiation detectors, and outputs display data representing a radiation distribution on the basis of the radiation detection signal. Hereinafter, the respective functional units illustrated in FIG. 1 will be described.

The data acquisition unit 1 acquires a radiation detection signal from the above-described radiation detectors (not shown) multiple times in a time-series manner. At this time, the data acquisition unit 1 also acquires positional information relating to the position in the array of the radiation detectors for the radiation detection signal. To this end, the data acquisition unit 1 may be connected to the γ-ray detector array by signal lines so as to identify the respective γ-ray detectors from the γ-ray detector array or may receive radiation intensity data including positional information from the γ-ray detector array.

The data acquisition unit 1 converts the acquired radiation detection signal (radiation intensity signal) to two-dimensional radiation data 101 in a two-dimensional arrangement format of {I (row)×J (column)}. Here, it is assumed that I and J are integers, and are hereinafter expressed as resolution {I (row)×J (column)}. For example, the two-dimensional radiation data 101 has radiation intensity data in a two-dimensional arrangement format of resolution {16 (row)×16 (column)}.

Figure 2:
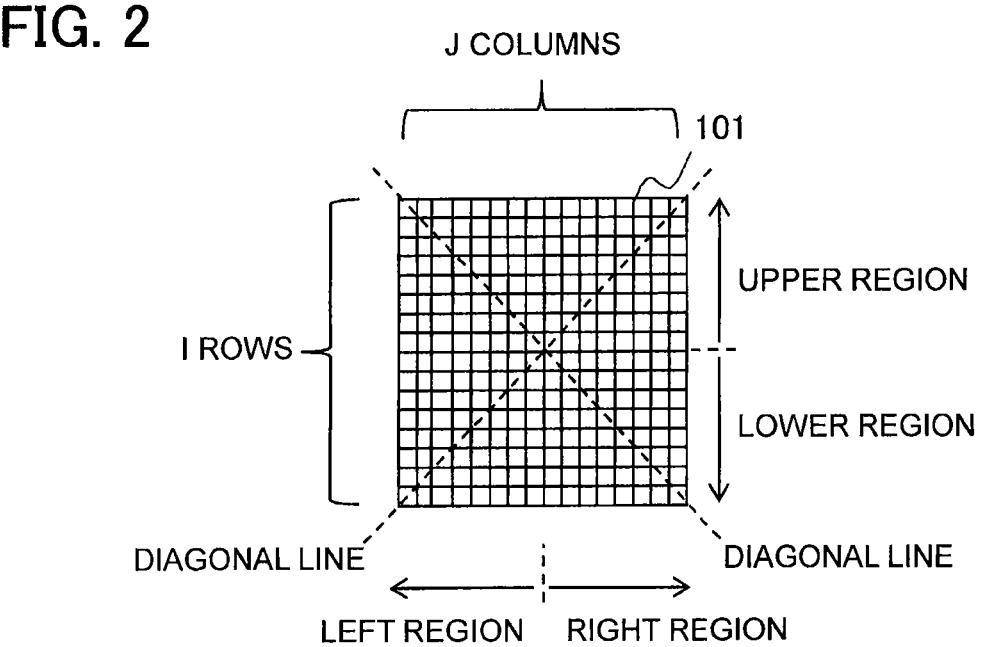
FIG. 2 is a diagram illustrating an example of the arrangement of two-dimensional radiation data.

FIG. 2 illustrates an example of the arrangement of the two-dimensional radiation data 101.

For example, as illustrated in FIG. 2, the data acquisition unit 1 converts the radiation detection signal (or radiation intensity data or the like) acquired from the radiation detectors to the two-dimensional radiation data 101 in a two-dimensional arrangement format of I (row)×J (column). The data acquisition unit 1 adapts the arrangement of the γ-ray detector array to the resolution {I (row)×J (column)} of the two-dimensional radiation data 101. The two-dimensional radiation data 101 has detection position information and radiation intensity information, and may be thus handled as three-dimensional data.

FIG. 2 illustrates an example of upper and lower regions and left and right regions with an array arrangement direction in the γ-ray detector array as a reference. FIG. 2 also illustrates an example of a diagonal direction. For example, the upper region is a first row to an I/2-th row (when I/2 is an integer) of the two-dimensional arrangement, and the lower region is an (I/2+1)th row to an I-th row. An inner region (not shown) is, for example, a region in a range of an I/4-row to a 3I/4-th row (in case of an integer) and a J/4-th column to a 3J/4-th column (in case of an integer), and an outer region is outside the inner region.

In order to allow a radiation detection direction to be recognizable, the data division processing unit 2 divides two-dimensional radiation data 101 into a plurality of regions for each section of recognizable direction. The data division processing unit 2 generates divided data 102a, 102b, and 102c having data in which two-dimensional radiation data 101 is divided into, for example, regions of upper and lower regions, left and right regions, and inner (center) and outer (outside the center) regions illustrated in FIG. 2.

As illustrated in FIG. 1, the divided data 102a is data in which the two-dimensional radiation data 101 is sectioned into an upper region 102U and a lower region 102D divided in a vertical direction. The divided data 102b is data in which the two-dimensional radiation data 101 is sectioned into a left region 102L and a right region 102R of data divided into a horizontal direction. The divided data 102c is data in which the two-dimensional radiation data 101 is sectioned into an inner region 102I and an outer region 102O divided into the inner and the outside of the center. For example, the center is the region of the two-dimensional radiation data 101 corresponding to the center of the γ-ray detector array.

Here, as the division method of the two-dimensional radiation data 101, a division method other than the method illustrated in FIG. 1 may be used. For example, as illustrated in FIG. 2, the two-dimensional radiation data 101 may be divided diagonally, and sections of specified directions may be four regions.

The divided regions of the divided data 102a described above correspond to the upper and lower regions of a display screen in a display device. The divided regions of the divided data 102b correspond to the left and right regions of the display screen, and the divided regions of the divided data 102c correspond to the center and the region outside the center on the display screen.

The integration processing unit 3 performs integration processing on the two-dimensional radiation data 101 acquired multiple times in a time-series manner for each section in which the two-dimensional radiation data 101 is divided. That is, the integration processing unit 3a integrates the divided data 102a sectioned into the upper region 102U and the lower region 102D. Similarly, the integration processing unit 3b integrates the divided data 102b sectioned into the right region 102R and the left region 102L, and the integration processing unit 3c integrates the divided data 102c sectioned into the inner region 102I and the outer region 102O.

As described above, the integrated values are generated by the integration processing unit 3 (3a, 3b, and 3c) for the respective divided data 102a, 102b, and 102c.

The data synthesis processing unit 4 subdivides and synthesizes the two-dimensional radiation data 101 integrated by the integration processing units 3a, 3b, and 3c. That is, the data synthesis processing unit 4 generates resynthesized two-dimensional data 104S.

Figure 3:
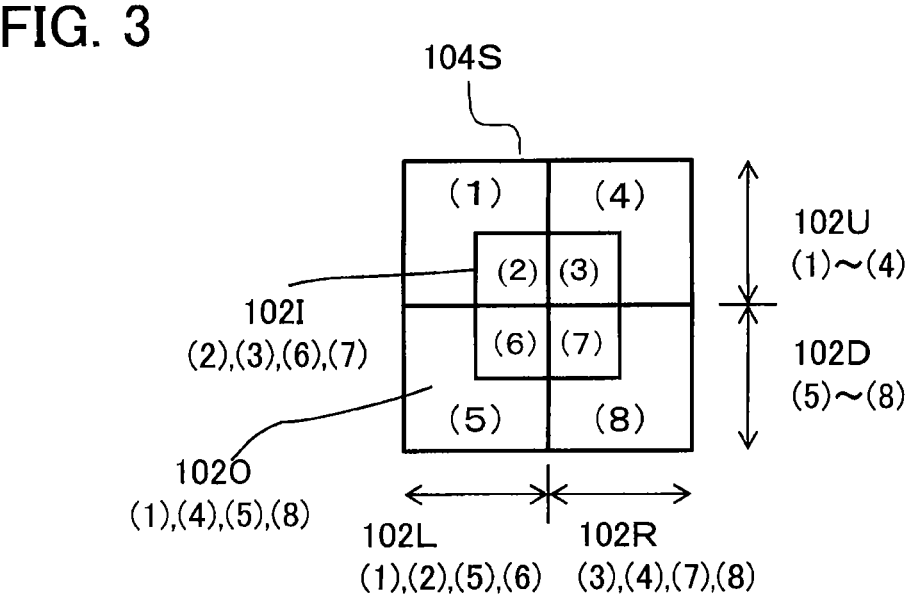
FIG. 3 is a diagram illustrating an example of resynthesis processing of the two-dimensional radiation display device of the first embodiment.

FIG. 3 illustrates an example of resynthesis processing by the data synthesis processing unit 4.

As illustrated in FIG. 3, for example, the data synthesis processing unit 4 performs weighting (synthesizes) of the upper region 102U and the lower region 102D, the right region 102R and the left region 102L, and the inner region 102I and the outer region 102O as resynthesized two-dimensional data 104S on the basis of the ratio of the integrated values of the regions.

For example, FIG. 3 illustrates the correspondence relationship between the weighted sections (1) to (8) and sections (upper region 102U, lower region 102D, left region 102L, right region 102R, inner region 102I, and outer region 102O) of specified direction. The regions are defined as follows:

Upper region 102U {range of sections (1) to (4)};
Lower region 102D {range of sections (5) to (8)};
Left region 102L {range of sections (1), (2), (5), and (6)};
Right region 102R {range of sections (3), (4), (7), and (8)};
Inner region 102I {range of sections (2), (3), (6), and (7)}; and
Outer region 102O {range of sections (1), (4), (5), and (8)}.

As described above, the data synthesis processing unit 4 further divides the sections of specified direction into the sections (1) to (8) (division into eight sections) to generate the resynthesized two-dimensional data 104S. The resynthesized two-dimensional data 104S is output from the data synthesis processing unit 4 to the image output unit 5.

The image output unit 5 displays a radiation distribution by color gradation display or shade display, such as grayscale, on the display screen according to the integration results of the sections (1) to (8) of the resynthesized two-dimensional data 104S. At this time, the image output unit 5 may display the visible image and the radiation distribution in a superimposed manner.

In this case, for example, the image output unit 5 superimposes the above-described radiation distribution image on the visible image on the basis of a viewing angle of a camera capturing the visible image and a viewing angle defined by a pinhole for detecting a radiation and a detector effective area. Accordingly, the two-dimensional radiation display device of this embodiment can allow the radiation distribution image representing the radiation detection direction to be displayed on the visible image or video being imaged.

Figure 4:
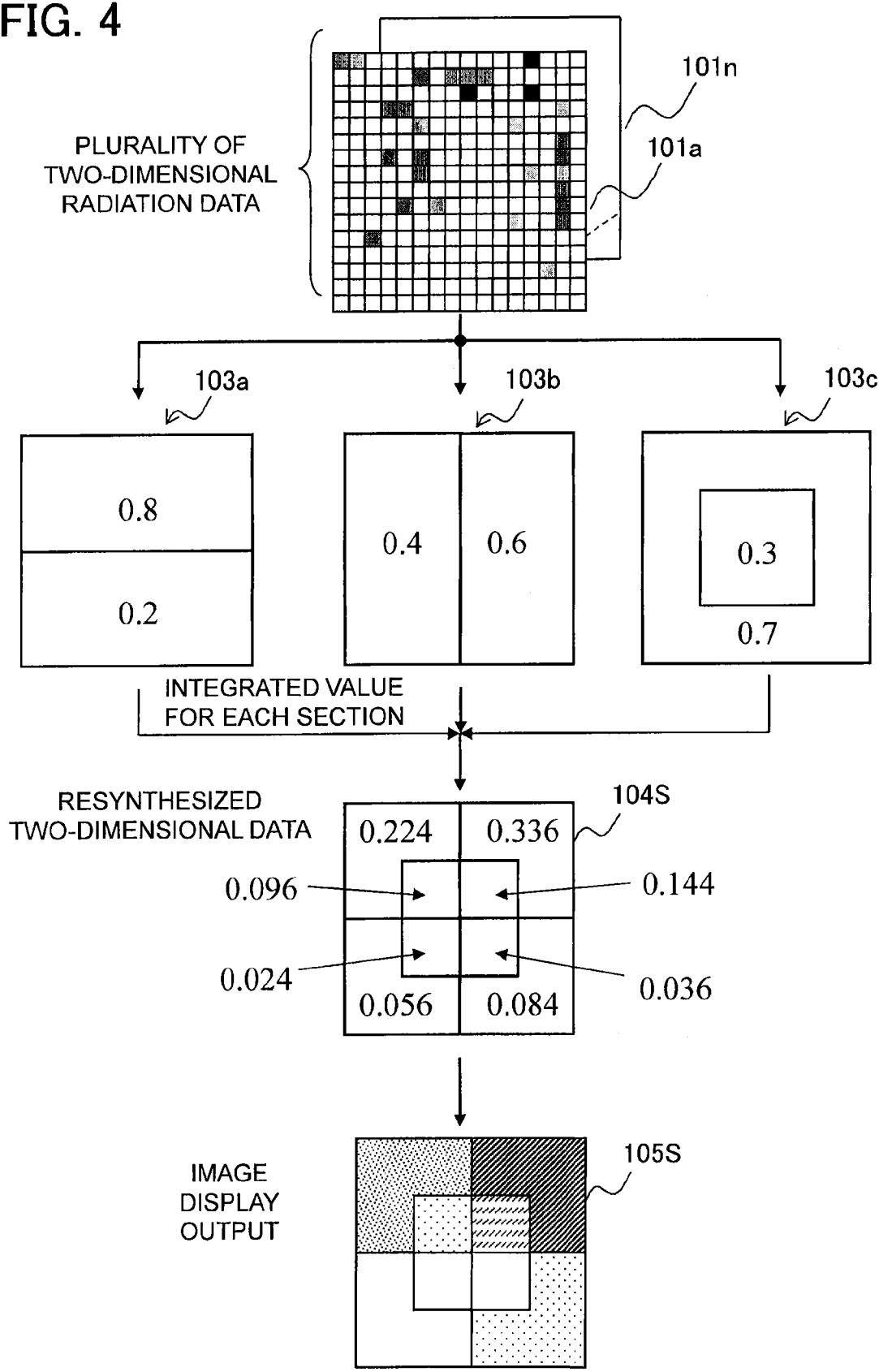
FIG. 4 is a diagram illustrating a two-dimensional radiation display processing flow of the first embodiment.

FIG. 4 illustrates an example of a two-dimensional radiation display processing flow of the first embodiment. Hereinafter, the two-dimensional radiation display processing flow of FIG. 4 will be described referring to FIGS. 1 to 3.

The data acquisition unit 1 acquires data, such as two-dimensional radiation data 101a, . . . , and 101n, from the radiation detectors (not shown) multiple times at time intervals. The integration processing unit 3 integrates the two-dimensional radiation data 101a, . . . , and 101n according to the division section of the data division processing unit 2.

That is, the integration processing unit 3a integrates radiation intensity data within a range of each of the upper region 102U and the lower region 102D for each of the two-dimensional radiation data 101a, . . . , and 101n to obtain an integrated value 103a, as illustrated in FIG. 4. For example, in the example of FIG. 4, when the radiation intensity of the entire region is 1, [the integrated value of the upper region 102U]: [the integrated value of the lower region 102D]=0.8:0.2. Similarly, in an integrated value 103b, [the integrated value of the left region 102L]:[the integrated value of the right region 102R]=0.4:0.6. In an integrated value 103c, [the integrated value of the inner region 102I]: [the integrated value of the outer region 102O]=0.3:0.7.

If the integrated values 103a, 103b, and 103c are received from the integration processing units 3a, 3b, and 3c, as illustrated in FIG. 4, the data synthesis processing unit 4 performs weighting (radiation intensity distribution) of the above-described sections (1) to (8) to generate the resynthesized two-dimensional data 104S.

In the example of FIG. 4, the intensity distribution of the sections {(1), (2), (3), (4), (5), (6), (7) and (8)}={0.224, 0.096, 0.144, 0.336, 0.056, 0.024, 0.036 and 0.084}, respectively.

If the resynthesized two-dimensional data 104S is received from the data synthesis processing unit 4, the image output unit 5 outputs an image display output 105S to the display screen. For example, in the example illustrated in FIG. 4, the integrated values of the above-described sections (1) to (8) are represented by dot display, shaded display, or the like such that the difference in intensity distribution between the sections can be identified. Practically, display is performed by radiation intensity such that the difference in relative intensity can be recognized using a display method (predetermined display format), such as shade display or color gradation display.

Next, improvement of detection sensitivity in the first embodiment will be described. For example, when the resolution of the two-dimensional radiation data 101 is I (row)×J (column), the integration processing unit 3a integrates (I/2)×J pieces of data in the upper region 102U. Thus, the resynthesized two-dimensional data 104S has sensitivity of (I/2)×J times for each element of the two-dimensional radiation data 101, and a count value is improved. For example, when I=J=16, (I/2)×J=128, and the radiation distribution can be displayed with sensitivity of 128 times.

A specific example will be described. For example, when a γ-ray detector array is used for radiation detectors, it is assumed that γ-ray detector array has resolution of 256 pixels {16 (row)×16 (column)}. Furthermore, it is necessary to count 100 (count) pieces of data, in which the radiation direction can be identified, with the γ-ray detector array, and the count time period is 100 seconds. For example, when one detector in the γ-ray detector array is considered, the count time period of 100 seconds is required for 100 counting γ-rays.

This will be described in case of the two-dimensional radiation display device illustrated in FIG. 1. The data division processing unit 2 allocates the two-dimensional radiation data 101, data for 128 (=256/2) pixels, to each of the upper region 102U and the lower region 102D of the divided data 102a.

Since the integration processing unit 3a performs integration to data allocation for 128 pixels, it is possible to obtain sensitivity of 128 times compared to a case where 100 (count) pieces of data are counted as one pixel. That is, the count time necessary for specifying the vertical direction as the radiation direction is 0.78 seconds (=100 seconds/128). The same applies to the sections of other directions, such as the horizontal direction.

As described above, in the arrangement I (row)×J (column) of the two-dimensional radiation data 101, although the resolution is better as I or J is greater, in order that radiation is detected in all arrangement elements, a long time is required.

According to the two-dimensional radiation display device of the first embodiment, for example, radiation is counted and integrated for each of the regions of each section of specified direction, such as the upper side and the lower side, the left side and the right side, and the center side and the outer side, thereby improving detection sensitivity and suppressing statistical variation in a short time.

According to the two-dimensional radiation display device of the first embodiment, for example, since two-dimensional radiation distribution data is resynthesized on the basis of each of the regions of each section of specified direction, such as the upper side and the lower side, the left side and the right side, and the center side and the outer side, it becomes possible to accurately understand the radiation detection direction in a short time and to recognize a contaminated part in a short time.

Therefore, it becomes possible to recognize a contaminated part in a short time even in a low air dose environment.

[Second Embodiment]

Figure 5:
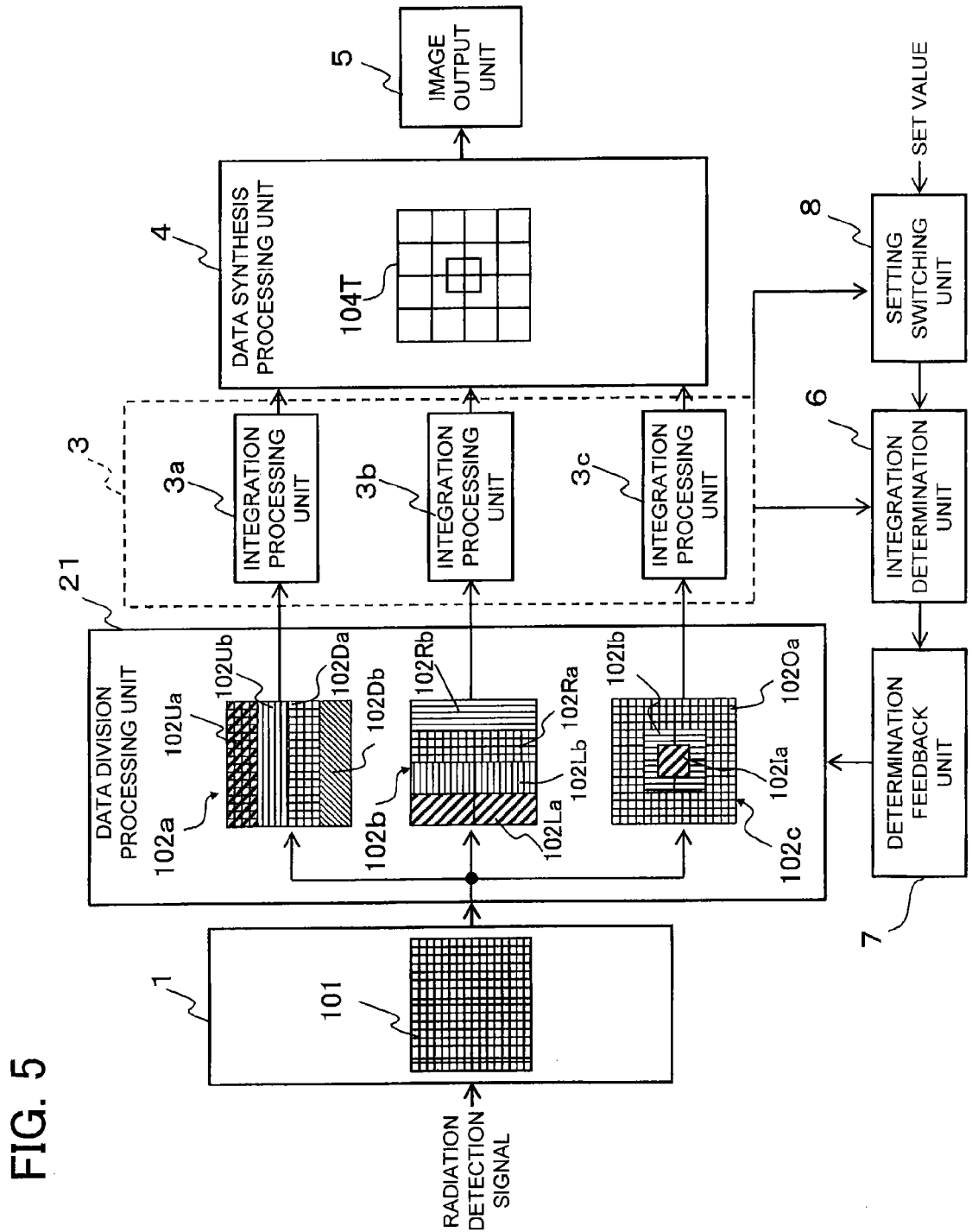
FIG. 5 is a block diagram illustrating the configuration of a second embodiment of a two-dimensional radiation display device according to the present invention.

FIG. 5 is a block diagram illustrating the configuration of a second embodiment of a two-dimensional radiation display device according to the present invention. The second embodiment will be described referring to FIG. 5. In FIG. 5, the same functional units as those in the first embodiment of FIG. 1 are represented by the same reference numerals.

In the configuration of the second embodiment illustrated in FIG. 5, in addition to the functional units corresponding to the configuration of the first embodiment illustrated in FIG. 1, an integration determination unit 6, a determination feedback unit 7, and a setting switching unit 8 are further provided. The functional units corresponding to the configuration of FIG. 1 are a data acquisition unit 1, a data division processing unit 21, an integration processing unit 31, a data synthesis processing unit 4, and an image output unit 5.

The integration determination unit 6 receives the integration results (integrated values) from the integration processing unit 3a, the integration processing unit 3b, and the integration processing unit 3c. The integration determination unit 6 determines whether or not the integrated value of each of the regions of the divided data 102a, 102b, and 102c has "sufficient precision" or is "statistically significant". The integration determination unit 6 gives notification of the integration determination result to the determination feedback unit 7.

If the integration determination result is received from the integration determination unit 6, when it is determined that the integrated value of each region has "sufficient precision" or is "statistically significant", the determination feedback unit 7 issues an instruction to the data division processing unit 21 to increase the number of divisions for the region. When it is determined that the integrated value of the region does not have "sufficient precision" or is not "statistically significant", the determination feedback unit 7 issues an instruction to maintain the number of divisions.

If the instruction from the determination feedback unit 7 is received, the data division processing unit 21 determines whether or not to change the number of divisions of the two-dimensional radiation data 101 on the basis of the instruction.

In the data division processing unit 21 illustrated in FIG. 5, for example, at the beginning of radiation detection, the divided data 102a, 102b, and 102c are in the divided states (two sections of upper and lower sections, two sections of left and right sections, and two sections of inner and outer sections) illustrated in FIG. 1. If the integrated value becomes larger with time of radiation detection, when an instruction to further subdivide the upper region of the divided data 102a into two regions on the basis of the integration determination result is received from the determination feedback unit 7, the data division processing unit 21 divides the upper region into a first upper region 102Ua and a second upper region 102Ub.

Similarly, when an instruction is received from the determination feedback unit 7 to increase the number of divisions of the lower region of the divided data 102a, for example, the data division processing unit 21 divides one lower region into a first lower region 102Da and a second lower region 102Db.

Similarly, when an instruction is received from the determination feedback unit 7 to increase the number of divisions of the left region of the divided data 102b, for example, the data division processing unit 21 divides one left region into a first left region 102La and a second left region 102Lb. When an instruction is received from the determination feedback unit 7 to increase the number of divisions of the right region of the divided data 102b, for example, the data division processing unit 21 divides one right region into a first right region 102Ra and a second right region 102Rb. In regard to the division of the inner region, similarly, the data division processing unit 21 divides, for example, one inner region into a first inner region 102Ia and a second inner region 102Ib for the divided data 102c.

In this example, although the outer region 102Oa is not divided, the outer region 102Oa may be further subdivided. In the above-described example, division is determined for each region. Alternatively, all regions may be subdivided, when it is determined to increase the number of divisions of any one region.

Similarly, the integration processing unit 31 obtains the integrated value in each of the subdivided regions of the divided data 102a, 102b, and 102c for each subdivided section of specified direction.

The data synthesis processing unit 4 synthesizes the integrated value for each section of specified direction integrated by the integration processing units 3a, 3b, and 3c. Accordingly, the data synthesis processing unit 4 generates resynthesized two-dimensional data 104T.

Figure 6:
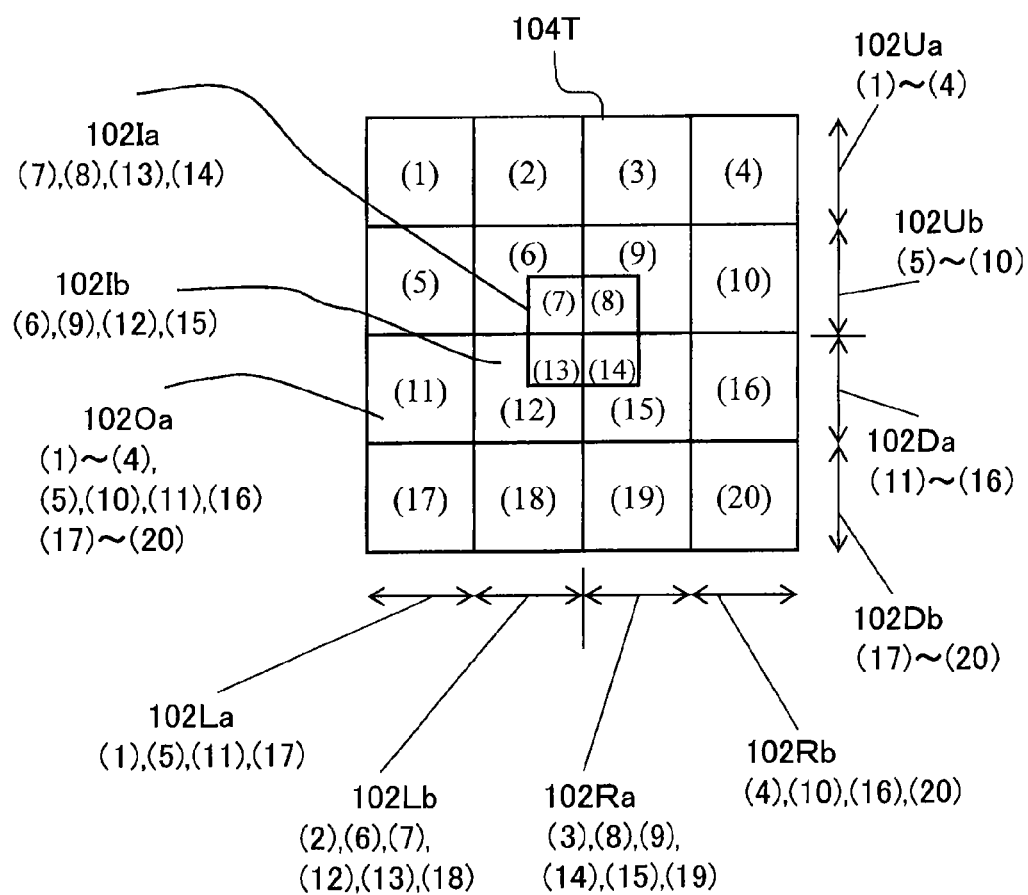
FIG. 6 is a diagram illustrating an example of resynthesis processing of the two-dimensional radiation display device of the second embodiment.

FIG. 6 illustrates an example of resynthesis processing by the data synthesis processing unit 4. The example illustrated in FIG. 6 is an example where sections of eight divisions illustrated in FIG. 3 are subdivided into 20 divisions.

As illustrated in FIG. 6, for example, the resynthesized two-dimensional data 104T is synthesized by weighting the integrated values in the first and the second upper regions 102Ua and 102Ub, the first and the second lower regions 102Da and 102Db, the first and the second left regions 102La and 102Lb, the first and the second right regions 102Ra and 102Rb, and the outer region 102Oa by the data synthesis processing unit 4.

For example, FIG. 6 illustrates the sections (1) to (20) (in case of 20 divisions) of weighting (distribution) obtained from the sections of the above-described regions, as follows:

first upper region 102Ua {range of sections (1) to (4)};
second upper region 102Ub {range of sections (5) to (10)};
first lower region 102Da {range of sections (11) to (16)};
second lower region 102Db {range of sections (17) to (20)};
first left region 102La {range of sections (1), (5), (11), and (17)};
second left region 102Lb {range of sections (2), (6), (7), (12), (13), and (18)};
first right region 102Ra {range of sections (3), (8), (9), (14), (15), and (19)};
second right region 102Rb {range of sections (4), (10), (16), and (20)};
first inner region 102Ia {range of sections (7), (8), (13), and (14)};
second inner region 102Ib {range of sections (6), (9), (12), (15)}; and
outer region 102Oa {range of sections (1) to (4), (5), (10), (11), (16), (17) to (20)}.

As described above, for example, the data synthesis processing unit 4 further divides the sections of specified direction into the sections (1) to (20) to generate the resynthesized two-dimensional data 104T. The resynthesized two-dimensional data 104T is output from the data synthesis processing unit 4 to the image output unit 5.

Figure 7:
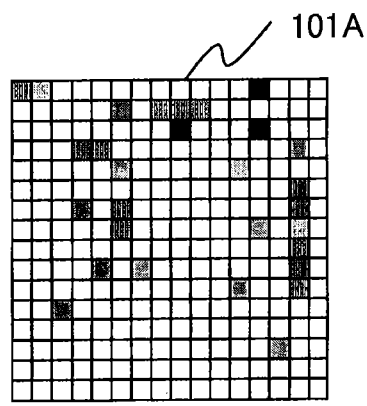
FIG. 7 is a diagram illustrating an example of two-dimensional radiation data.

For example, it is assumed that two-dimensional radiation data 101A and the like illustrated in FIG. 7 are acquired in the data acquisition unit 1 multiple times. The two-dimensional radiation data 101A and the like are integrated by the data division processing unit 21 and the integration processing unit 31, and the resynthesized two-dimensional data 104T illustrated in FIG. 8 is generated by the data synthesis processing unit 4.

Figure 8:
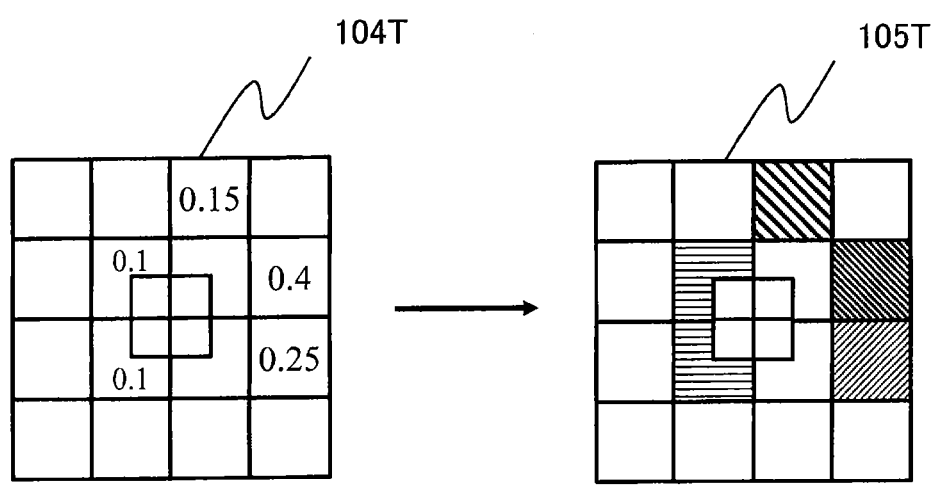
FIG. 8 is a diagram illustrating an example of display of resynthesized two-dimensional data.

The image output unit 5 displays a two-dimensional radiation distribution by color gradation display, color shade display, or the like on the display screen according to the integration results of the sections (1) to (20) of the resynthesized two-dimensional data 104T illustrated in FIG. 8 like an image display output 105T illustrated in FIG. 8.

The setting switching unit 8 sets or switches a determination reference for determining the integration determination result of the integration determination unit 6, and sends a set value to the integration determination unit 6. For example, the set value is an integrated value described below.

Hereinafter, an example of determination processing of precision ("sufficient precision") of the integration determination unit 6 will be described.

When it is determined that precision is 1% from the integrated value of each divided data region (section) to 1σ, for example, the integration determination unit 6 determines whether or not the integrated value S of each section is equal to or greater than 10,000. Similarly, when it is determined that precision is 10% from the integrated value of each section to 1 σ, for example, the integration determination unit 6 determines that the integrated value S of each section is equal to or greater than 100. Although the integrated value S of 10,000 or 100 is a determination value depending on precision, it is assumed that an arbitrary determination value can be set by the set value by the setting switching unit 8. Note that σ is a standard deviation.

Next, an example of determination processing of "statistically significance" of the integration determination unit 6 will be described.

In general, although the two-dimensional radiation data 101 is two-dimensional distribution data of radiation intensity (the count value per unit time), the two-dimensional radiation data 101 also includes the count value of radiation by scattering from the structure around the radiation detector. The count value by scattering loses intrinsic distribution information. That is, for example, each element (i, j) of the two-dimensional radiation data 101 generated by the data acquisition unit 1 includes intensity distribution data and scattering data with lost distribution information for the count value acquired from the γ-ray radiation detector array. The same applies to the integrated value S obtained by integrating the count value of each section. In the arrangement I (row)×J (column) of the two-dimensional radiation data 101, "I" is an integer equal to or greater than 1 and equal to or smaller than I, and "j" is an integer equal to or greater than 1 and equal to or smaller than J.

The scattering data can be reduced by the structure around the radiation detector or shielding but cannot be zero. Although the scattering data cannot be reduced to zero, the ratio by scattering in the integrated value S can be obtained by a structure around a radiation detector, design for shielding, or an experiment. The ratio by scattering in the integrated value S is referred to as α. Although α may not be exactly the same value for all elements (i, j), a maximum value may be used.

In the integrated value S, $(1-\alpha) \times S$ is an integrated value having directional information, and $\alpha \times S$ is an integrated value by scattering. Here, the integrated value having directional information has variation of $\pm\sqrt{((1-\alpha)S)}$, and the integrated value by scattering has variation of $\pm\sqrt{(\alpha S)}$. In order that the integrated value S is statistically significant with respect to the integrated value by scattering, the integrated value S satisfies the following expression, and the integrated value S is regarded as "statistically significant" and is set as a first determination value.

$$((1-\alpha)S - \sqrt{((1-\alpha)S)}) > (\alpha S + \sqrt{(\alpha S)}) \quad \text{(Expression 1)}$$

When it cannot be said that the integrated value of about 1σ is sufficiently significant, the integrated value may be about 3σ. In this case, an integrated value S satisfying the following expression is set as a second determination value.

$$((1-\alpha)S - 3\sqrt{((1-\alpha)S)}) > (\alpha S + 3\sqrt{(\alpha S)}) \quad \text{(Expression 2)}$$

1σ or 3σ may be arbitrarily selected, and an integrated value S satisfying the following expression for x σ where X is an arbitrary number may be set as a third determination value.

$$((1-\alpha)S - X\sqrt{((1-\alpha)S)}) > (\alpha S + X\sqrt{(\alpha S)}) \quad \text{(Expression 3)}$$

The integration determination unit 6 determines to be "statistically significant" when the integrated value S obtained by the integration processing unit 31 satisfies any one of (Expression 1) to (Expression 3).

The integration determination unit 6, the determination feedback unit 7, and the setting switching unit 8 are provided, whereby it is possible to automatically perform switching so as to further subdivide sections of specified direction. The switching is performed when the integrated value of each section has "sufficient precision" or is "statistically significant". Accordingly, for example, even when there are sections in eight divisions at the beginning of radiation detection, with switching for subdivision, detailed sections in the number of divisions exceeding the eight divisions, . . . , 20 divisions, or the like may be provided later.

In regard to the processing in which the integration determination unit 6 determines to be "sufficient precision" or "statistically significant", alternatively, manual setting means (not shown) may be provided and the operator of the two-dimensional radiation display device may manually set subdivision to the data division processing unit 21.

In the arrangement I (row)×J (column) of the two-dimensional radiation data 101, although the resolution becomes higher as I or J is larger, a longer time is required such that radiation is detected in all arrangement elements.

However, according to the two-dimensional radiation display device of the second embodiment, at the beginning of radiation detection, the number of regions of a small number of sections of upper and lower, left and right, and center is set, whereby it is possible to recognize the radiation detection direction in a short time. It is also possible to improve detection sensitivity for integration for each section, and to suppress statistical variation in a short time. That is, it becomes possible to recognize a contaminated part in a short time.

According to the two-dimensional radiation display device of the second embodiment, since it is possible to perform switching to display in which the regions of each section of upper and lower, left and right, and center are further subdivided with time of radiation detection, it is also possible to perform display with further increased resolution later. The subdivision can be performed up to the resolution of the two-dimensional radiation data 101.

[Third Embodiment]

Figure 9:
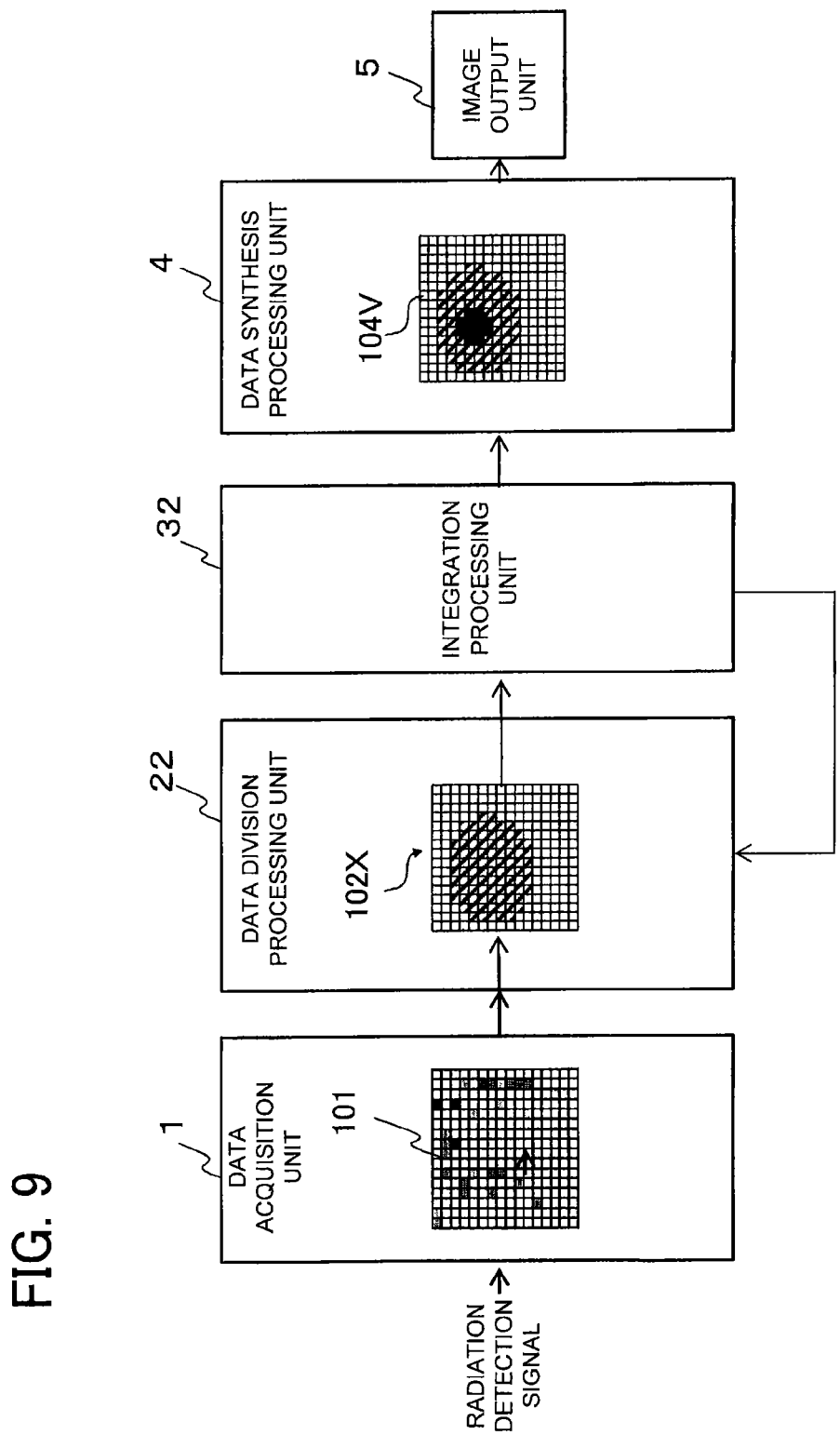
FIG. 9 is a block diagram illustrating the configuration of a third embodiment of a two-dimensional radiation display device according to the present invention.

FIG. 9 is a block diagram illustrating the configuration of a third embodiment of a two-dimensional radiation display device according to the present invention. The third embodiment will be described referring to FIG. 9. In FIG. 9, the same functional units as in the configuration of the first embodiment of FIG. 1 are represented by the same reference numerals. In the configuration illustrated in FIG. 9, the data division processing unit 2 in the configuration of FIG. 1 is replaced with a region determination data division processing unit 22, and the integration processing unit 3 is replaced with an integration processing unit 32.

The region determination data division processing unit 22 determines a region where the integrated value satisfies "sufficient precision" or "statistically significant" and the rest region using the integration result around the maximum value of the two-dimensional radiation data 101 acquired by the data acquisition unit 1, and performs division according to the determination result.

The integration processing unit 32 performs integration processing on divided data 102X for each region divided by the region determination data division processing unit 22. The integration processing unit 32 sends an integration result for each divided region to the data synthesis processing unit 4 and also to the region determination data division processing unit 22.

When the integrated value by the integration processing unit 32 becomes a value still larger than the previous determination value (original determination value), the region determination data division processing unit 22 uses a value obtained by multiplying the original determination value, which has "sufficient precision" or is "statistically significant", by a value equal to or greater than 1 as a new determination value, and further subdivides the regions to be divided.

Figure 10:
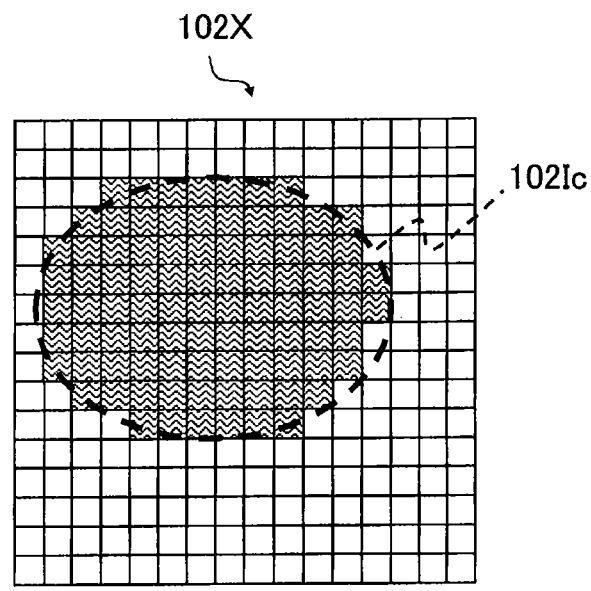
FIG. 10 is a diagram illustrating an example of a data region to be divided.
Figure 11:
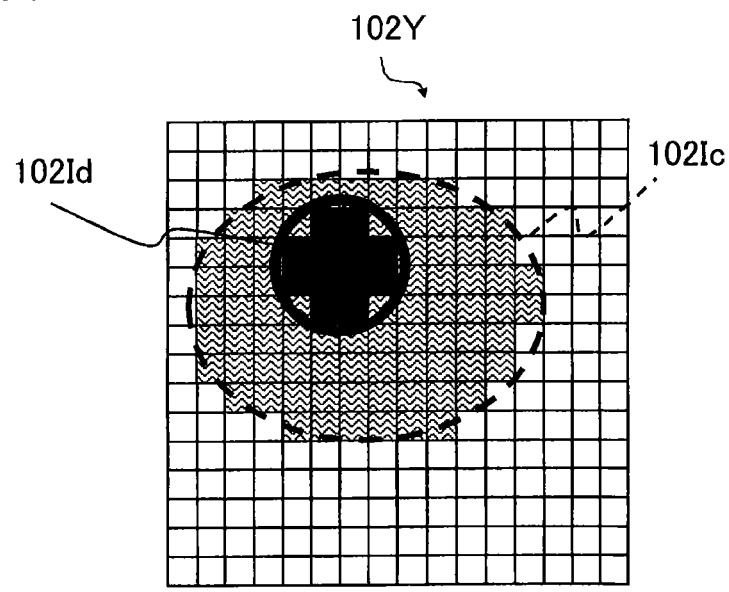
FIG. 11 is a diagram illustrating another example of a data region to be divided.

FIGS. 10 and 11 illustrate an example of subdivision of regions to be divided by the region determination data division processing unit 22. FIG. 10 illustrates an example where the determination value of integration for sectioning regions in divided data 102X is set to be 100. FIG. 11 illustrates an example where, initially, the determination value of integration for sectioning regions in divided data 102Y is set to be 100, and subsequently, the determination value of subsequent integration is set to be 400.

Specifically, as illustrated in FIG. 10, the region determination data division processing unit 22 initially determines and divides the divided data 102X into a first divided region 102Ic (broken-line portion) and the rest region, that is, a region where the integrated value satisfies the determination value of "sufficient precision" or "statistically significant"=100, and the rest region.

Next, for example, when the integrated value of the first divided region 102Ic by the integration processing unit 32 becomes a value still larger than the previous determination value (original determination value=100) with time of radiation detection, the region determination data division processing unit 22 subdivides the regions to be divided as follows.

As illustrated in FIG. 11, the region determination data division processing unit 22 further determines and divides the divided data 102Y into a second divided region 102Id (blackened portion), that is, a region where the integrated value satisfies the determination value of "sufficient precision" or "statistically significant"=400 and the rest region.

When the region determination data division processing unit 22 detects large radiation intensity in a specific region for the two-dimensional radiation data 101, as illustrated in FIG. 11, it is possible to narrow and specify the range of a contaminated part by a radioactive material, for example, since the shape of the region can be further subdivided.

Accordingly, even if the radiation intensity distribution is the divided data 102X of FIG. 10 at the beginning of detection, when the radiation intensity distribution becomes the divided data 102Y illustrated in FIG. 11 with time of detection, it is possible to perform image display, such as resynthesized two-dimensional data 104V, as illustrated in FIG. 9.

As described above, according to the third embodiment, it becomes possible to specify a direction by an arbitrary shape. Furthermore, it becomes possible to subdivide and specify the direction of contaminated part or the like by a radioactive material with time of radiation detection.

[Fourth Embodiment]

Figure 12:
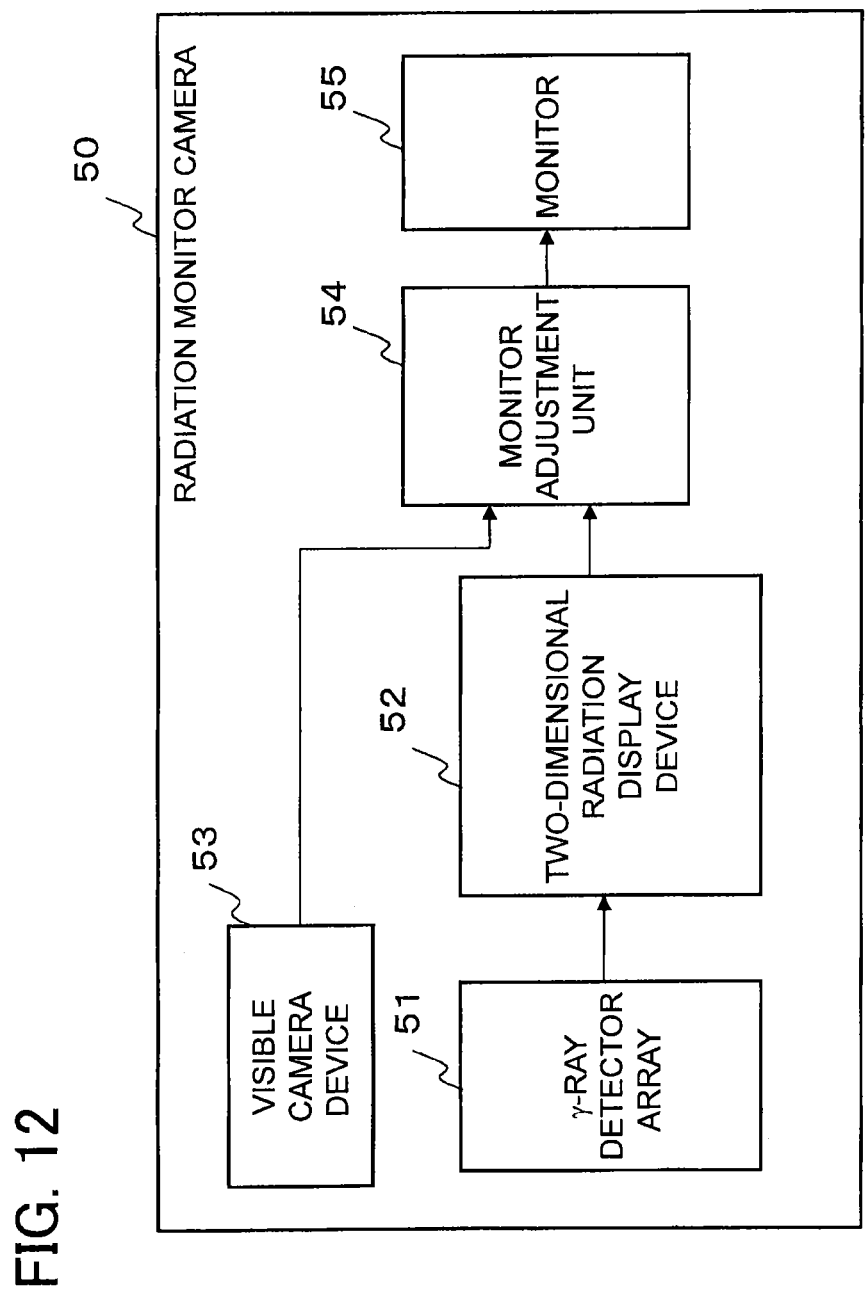
FIG. 12 is a block diagram illustrating the configuration of a fourth embodiment of a two-dimensional radiation display device according to the present invention.

FIG. 12 is a block diagram illustrating the configuration of a fourth embodiment of a two-dimensional radiation display device according to the present invention, and specifically, is a block diagram of the configuration of a radiation monitor camera using a two-dimensional radiation display device.

The configuration of a two-dimensional radiation display device 52 illustrated in FIG. 12 is, for example, any embodiment of the two-dimensional radiation display device of the first to third embodiments. Here, detailed description of the functions of the two-dimensional radiation display device 52 will not be repeated.

As illustrated in FIG. 12, the radiation monitor camera 50 includes a γ-ray detector array 51, a two-dimensional radiation display device 52, a visible camera device 53, a monitor adjustment unit 54, and a monitor 55.

The γ-ray detector array 51 is, for example, a γ-ray detector array having collimators.

The two-dimensional radiation display device 52 is a device in which the functions of the two-dimensional radiation display device of the first to third embodiments are provided in the form of an integrated circuit, a device in which a program for causing a computer including a CPU, a memory, a ROM, and the like to execute the functions of two-dimensional radiation display processing is embedded, or the like.

For example, the visible camera device 53 can image an object within a viewing angle of a camera by a CCD or the like and outputs a visible image to the monitor adjustment unit 54 using a predetermined signal output.

The monitor adjustment unit 54 superimposes a two-dimensional radiation image generated by the two-dimensional radiation display device 52 on a visible image imaged by the visible camera device 53. The monitor adjustment unit 54 adjusts a display image to be synthesized on the basis of the viewing angle of the visible camera device 53 and the viewing angle of the γ-ray detector array 51. Furthermore, the monitor adjustment unit 54 adjusts shade, color gradation, or the like of the two-dimensional radiation image of the two-dimensional radiation display device 52.

The monitor 55 has a display screen and outputs the synthesized display image to the display screen.

With the above, it becomes possible to easily identify a contaminated part by a radioactive material on the monitor 55 of the radiation monitor camera 50.

[Other Embodiments]

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Explanation Of Reference Symbols
1: data acquisition unit
2, 21: data division processing unit
3, 3a, 3b, 3c, 31, 32: integration processing unit
4: data synthesis processing unit
5: image output unit
6: integration determination unit
7: determination feedback unit
8: setting switching unit
22: region determination data division processing unit
50: radiation monitor camera
51: γ-ray detector array
52: two-dimensional radiation display device
53: visible camera device
54: monitor adjustment unit
55: monitor
101, 101A, 101a, 101n: two-dimensional radiation data
102, 102a, 102b, 102c, 102X, 102Y: divided data
102U: upper region
102Ua: first upper region
102Ub: second upper region
102D: lower region
102Da: first lower region
102Db: second lower region
102L: left region
102La: first left region
102Lb: second left region
102R: right region
102Ra: first right region
102Rb: second right region
102I: inner region
102Ia: first inner region
102Ib: second inner region
102Ic: first divided region
102Id: second divided region
102O, 102Oa: outer region
103a, 103b, 103c: integrated value
104S, 104T, 104V: resynthesized two-dimensional data
105S, 105T: image display output

The invention claimed is:

1. A two-dimensional radiation display device which receives a radiation detection signal from an array of a plurality of radiation detectors arranged in a two-dimensional manner and is able to output display data for displaying a radiation distribution on a basis of the radiation detection signal, the two-dimensional radiation display device comprising:
   a data acquisition unit which converts the radiation detection signal detected multiple times from the plurality of radiation detectors to two-dimensional radiation data corresponding to positions in the array;
   a data division processing unit which divides the two-dimensional radiation data converted by the data acquisition unit into regions of each section of specified direction;
   an integration processing unit which integrates the two-dimensional radiation data for each of the regions of each section of specified direction divided by the data division processing unit;
   a data synthesis processing unit which synthesizes two-dimensional data representing a radiation distribution on a basis of an integrated value of each of the regions of each section of specified direction integrated by the integration processing unit; and
   an image output unit which outputs the two-dimensional data synthesized by the data synthesis processing unit as display data according to a predetermined display format.

2. The two-dimensional radiation display device according to claim 1,
   wherein each section of the specified direction is a combination including at least one of combinations of upper and lower regions, left and right regions, and inner and outer regions based on an array arrangement direction in the array of the plurality of radiation detectors.

3. The two-dimensional radiation display device according to claim 1,
   wherein each section of the specified direction is a combination of two diagonals based on an array arrangement direction in the array of the plurality of radiation detectors.

4. The two-dimensional radiation display device according to claim 2,
   wherein the data division processing unit divides at least one of the regions of each section of the specified direction into subdivided regions.

5. The two-dimensional radiation display device according to claim 1, further comprising:
   an integration determination unit which determines the integrated value obtained by the integration processing unit for each of the regions of each section of specified direction following a determination value as a reference for dividing the region;
   a determination feedback unit which feeds back an integration determination result changing the regions to be divided by the data division processing unit to the data division processing unit depending on the determination of the integration determination unit; and
   a setting switching unit which sets a set value for the determination value,
   wherein the data division processing unit determines whether or not to further divide each of the regions of each section of specified direction depending on the integration determination result fed back to the determination feedback unit, and divides the region according to the determination of the data division processing unit.

6. The two-dimensional radiation display device according to claim 5,
   wherein the setting switching unit sets the determination value to be switchable.

7. The two-dimensional radiation display device according to claim 6,
   wherein the integration determination unit determines the determination value on a basis of precision of the integrated value or a statistically significant value and determines whether or not to subdivide the regions divided by the data division processing unit with the determined determination value as a reference.

8. The two-dimensional radiation display device according to claim 1,
   wherein the image output unit outputs the two-dimensional data synthesized by the data synthesis processing unit as display data according to the predetermined display format.

9. A two-dimensional radiation display device which receives a radiation detection signal from an array of a plurality of radiation detectors arranged in a two-dimensional manner and is able to output display data for displaying a radiation distribution on a basis of the radiation detection signal, the two-dimensional radiation display device comprising:

a data acquisition unit which converts the radiation detection signal detected multiple times from the plurality of radiation detectors to two-dimensional radiation data corresponding to positions in the array;

a region determination data division processing unit which divides the two-dimensional radiation data converted by the data acquisition unit to be equal to or greater than the determination value according to a determination value as a reference for dividing regions;

an integration processing unit which integrates the two-dimensional radiation data for each of the regions divided by the region determination data division processing unit;

a data synthesis processing unit which synthesizes two-dimensional data representing a radiation distribution on a basis of an integrated value of each of the regions of each section of specified direction integrated by the integration processing unit; and an image output unit which outputs the two-dimensional data synthesized by the data synthesis processing unit as display data according to a predetermined display format, wherein the region determination data division processing unit determines the determination value on a basis of precision of the integrated value or a statistically significant value and divides the two-dimensional radiation data with the determination value determined by the region determination data division processing unit as a reference.

10. A two-dimensional radiation display method for a two-dimensional radiation display device which receives a radiation detection signal from an array of a plurality of radiation detectors arranged in a two-dimensional manner and is able to output display data for displaying a radiation distribution on a basis of the radiation detection signal, the two-dimensional radiation display method comprising:

a data acquisition step of causing data acquisition means of the two-dimensional radiation display device to convert the radiation detection signal detected multiple times from the plurality of radiation detectors to two-dimensional radiation data corresponding to positions in the array;

a data division processing step of causing data division processing means of the two-dimensional radiation display device to divide the two-dimensional radiation data converted in the data acquisition step into regions of each section of specified direction;

an integration processing step of causing integration processing means of the two-dimensional radiation display device to integrate the two-dimensional radiation data for each of the regions of each section of specified direction divided in the data division processing step;

a data synthesis processing step of causing data synthesis processing means of the two-dimensional radiation display device to synthesize two-dimensional data representing a radiation distribution on a basis of an integrated value of each of the regions of each section of specified direction divided in the integration processing step; and an image output step of causing image output means of the two-dimensional radiation display device to output the two-dimensional data synthesized in the data synthesis processing step as display data according to a predetermined display format.

11. A two-dimensional radiation display method for a two-dimensional radiation display device which receives a radiation detection signal from an array of a plurality of radiation detectors arranged in a two-dimensional manner and is able to output display data for displaying a radiation distribution on a basis of the radiation detection signals, the two-dimensional radiation display method comprising:

a data acquisition step of causing data acquisition means of the two-dimensional radiation display device to convert the radiation detection signal detected multiple times from the plurality of radiation detectors to two-dimensional radiation data corresponding to positions in the array;

a region determination data division processing step of causing region determination data division processing means of the two-dimensional radiation display device to divide the two-dimensional radiation data converted in the data acquisition step according to a determination value as a reference for dividing regions;

an integration processing step of causing integration processing means of the two-dimensional radiation display device to integrate the two-dimensional radiation data for each of the regions divided in the region determination data division processing step;

a data synthesis processing step of causing data synthesis processing means of the two-dimensional radiation display device to synthesize two-dimensional data representing a radiation distribution on a basis of an integrated value of each of the divided regions integrated in the integration processing step; and an image output step of causing image output means of the two-dimensional radiation display device to output the two-dimensional data synthesized in the data synthesis processing step as display data according to a predetermined display format, wherein, in the region determination data division processing step, the determination value as a reference for dividing regions is determined on a basis of precision of the integrated value or a statistically significant value and the two-dimensional radiation data is divided with the determined determination value determined by the region determination data division processing step as a reference.

* * * * *